United States Patent [19]
Williams

[11] 3,910,191
[45] Oct. 7, 1975

[54] VARIABLE PRESSURE NOZZLE CLOSURE
[75] Inventor: Nathan P. Williams, Huntsville, Ala.
[73] Assignee: The United States of America as represented by the Secretary of the Army, Washington, D.C.
[22] Filed: May 7, 1974
[21] Appl. No.: 467,771

[52] U.S. Cl. ............. 102/49.3; 60/271; 239/265.11
[51] Int. Cl.² ............................................. F02K 1/00
[58] Field of Search ............. 60/254, 255, 256, 271; 239/265.11, 265.15; 102/49.3, 49.7

[56] References Cited
UNITED STATES PATENTS

| | | | |
|---|---|---|---|
| 2,561,670 | 7/1951 | Miller et al. | 102/49.7 |
| 2,690,124 | 9/1954 | Melick | 102/49.7 |
| 2,720,749 | 10/1955 | Beebe, Jr. | 60/256 |
| 3,121,310 | 2/1964 | Rice | 60/271 |
| 3,304,865 | 2/1967 | Gungle | 239/265.11 |
| 3,372,548 | 3/1968 | Mathis et al. | 60/271 |

*Primary Examiner*—Verlin R. Pendegrass
*Attorney, Agent, or Firm*—Robert P. Gibson; Nathan Edelberg

[57] ABSTRACT

A device for hermetically closing the nozzle end of a missile motor. The device can be installed in the nozzle from either the gas entrance side of the nozzle or the gas exit side of the nozzle. Provision is included in the device for varying the pressure required to blow it out of the nozzle during missile firing.

2 Claims, 2 Drawing Figures

VARIABLE PRESSURE NOZZLE CLOSURE

BACKGROUND OF THE INVENTION

This invention relates to the field of missile nozzle closures. Current concepts of nozzle closures fall into two categories which include those installed from the gas entrance side of the nozzle and those installed from the gas exit side. During routine inspections of the motor propellant grain the main disadvantage of the first category closures is that the nozzle has to be disconnected from the motor in order to check the propellant grain. The main disadvantage of closures in the second category is that they have to be sealed into the nozzle with an adhesive or a costly expansion ring type of locking device or they cannot be removed after being installed.

SUMMARY OF THE INVENTION

The present invention has overcome the above disadvantage by providing a device that can be installed in the nozzle from either the gas entrance or the gas exit side of the nozzle. In either case after installation the device can be easily removed from the nozzle for motor propellant grain inspection. The device is provided with an adjustable means to vary the blow-out pressure. An igniter may be secured to the gas entrance side of the expander and the igniter lead wires may exit the motor through a hole in the bolt. This arrangement increases missile safety by permitting a closure-igniter unit to be transported separate from the missile thus allowing installation when desired. Installation requires the use of only one tool to tighten a nut on the bolt to the desired torque.

This invention may be better understood from the following detailed description taken in conjunction with the accompanying drawing.

DESCRIPTION OF THE PREFERRED EMBODIMENT

Figure 1:
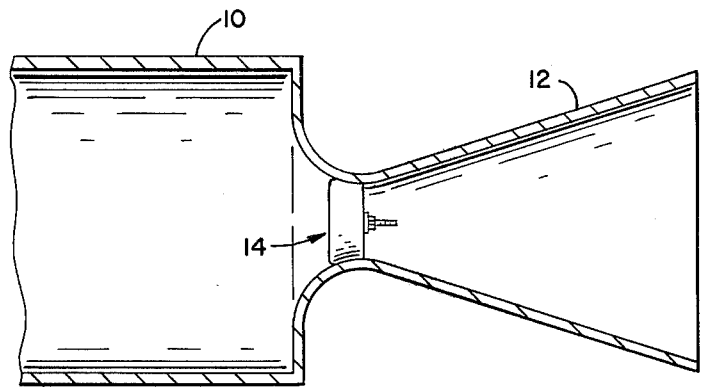
FIG. 1 shows a nozzle closure assembled in a missile.
Figure 2:
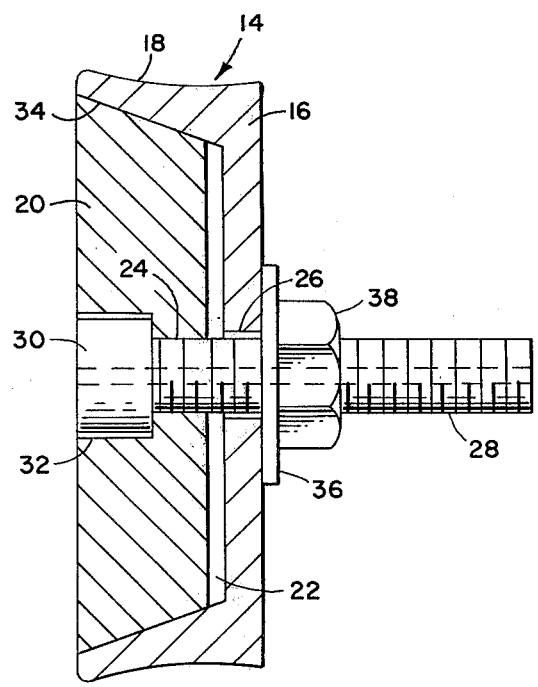
FIG. 2 is a sectional view of the nozzle closure.

Reference numeral 10 indicates a missile having an exhaust nozzle 12 and a variable pressure nozzle closure 14 installed to seal nozzle 12 as shown in FIG. 1. The closure, as shown in FIG. 2, includes an expansion seal 16 having a perpherial edge 18 which is radially expandable outward by interaction with a plug shaped expander 20. One side of the seal has a recessed opening 22 which houses expander 20 for cooperation with seal edge 18. Both the seal and the expander are provided with openings 24, 26 to allow passage of a connecting bolt 28. A holding nut 30 is attached to bolt 28 and fits into expander recess 32. The outer peripheral edge 34 of expander 20 is provided with a greater surface angle with respect to the horizontal axis of bolt 28 than the angle of the inner surface of edge 18. A washer 36 and a securing nut 38 are provided for securing the various parts together and applying torques.

In operation a closure is inserted in the throat of a missile motor nozzle. This closure can be inserted before final assembly from the motor side or after assembly from the nozzle side. Nut 38 is torqued into position so that the expander 20 causes expansion of seal 16 and thus controls the deformation of edge 18 as it engages the nozzle throat. The nut can be torqued to various psi's to control the position of expander 20 with respect to the seal and consequently the amount of pressure that the seal exerts on the nozzle throat. The force that the seal exerts on the throat controls the gas pressure required to blow the seal out of the throat during missile firing and can be varied to any desired limits. Controllable blow-out pressures can also be obtained by use of various materials and hardness of the seal 16 and expander 20 as well as using various mating surface angles between these parts. It can be seen that with this invention a missile does not have to be disassembled to remove the seal to check the propellant grain. In practice, the nut 38 is loosened to relieve the engaging force between the edge and the seal device is then free to be slid out of the nozzle.

I claim:

1. A variable pressure closure for use in hermatically sealing the nozzle end of a missile motor comprising: an expansion seal having an outer perpherical edge, said seal being provided with a recessed opening; a seal expander disposed in said recessed opening for engagement with said perpherial edge; a bolt having a holding nut at one end thereof; said seal and said expander being provided with central openings therethrough for passage of said bolt, and a securing nut on said bolt for variably drawing said expander into said seal recessed opening to outwardly expand said seal edge into engagement with said motor nozzle.

2. A variable pressure closure as set forth in claim 1 wherein said expander outer edge has a surface angle greater than the angle of the inner surface of said edge with respect to the horizontal axis of said bolt.

* * * * *